United States Patent
Marshall, III et al.

[15] 3,671,740
[45] June 20, 1972

[54] FREQUENCY-PROGRAMMED ELECTRON-CAPTURE DETECTOR

[72] Inventors: J. Howard Marshall, III, Pasadena; Timothy M. Harrington, Sierra Madre, both of Calif.

[73] Assignee: Analog Technology Corporation

[22] Filed: March 15, 1971

[21] Appl. No.: 124,291

[52] U.S. Cl. .................................. 250/43.5 R, 250/83.6 FT
[51] Int. Cl. ........................................................ G01n 23/12
[58] Field of Search .................. 250/43.5 R, 43.5 D, 43.5 FC, 250/43.5 FL, 43.5 MR, 83.6 FT, 83.6 R

[56] References Cited

UNITED STATES PATENTS 3,449,565   6/1969   Barringer ........................... 250/43.5 R

*Primary Examiner*—James W. Lawrence
*Assistant Examiner*—D. C. Nelms
*Attorney*—Leonard Golove et al.

[57] ABSTRACT

Improved circuitry for increasing the sensitivity of an electron-capture ionization detector includes a closed-loop feedback circuit which varies the frequency of pulses which are applied to the detector. The circuit responds to greater concentrations of predetermined compounds such as gases by increasing the pulse repetition frequency and responds to lower concentrations by decreasing the pulse repetition frequency, always tending to keep the current flowing in the detector circuit near a constant preset value. The pulse frequency will then vary directly with the concentration of sampled compound in the detector, and simple frequency-to-voltage conversion devices can be used to signal such concentrations.

10 Claims, 2 Drawing Figures

INVENTORS.
J. HOWARD MARSHALL III
TIMOTHY M. HARRINGTON
BY
ATTORNEYS.

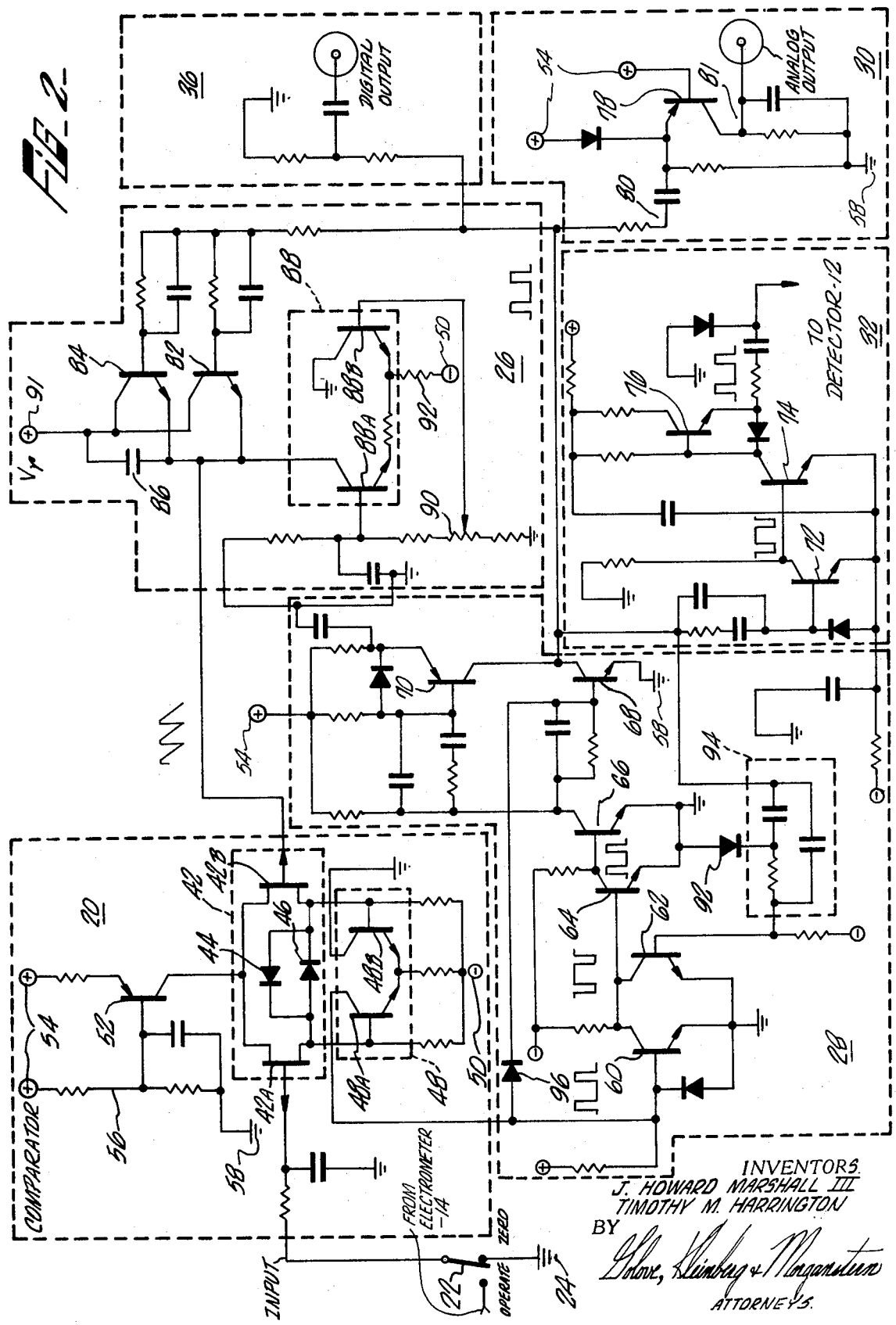

FREQUENCY-PROGRAMMED ELECTRON-CAPTURE DETECTOR

BACKGROUND OF THE INVENTION

1. Field of the Invention

This invention relates to apparatus for analyzing gases and vapors to determine the presence of compounds and, more particularly, to apparatus for improving the range and sensitivity of electron-capture ionization detectors which are used in such analyzing apparatus.

2. Description of the Prior Art

In the copending application of Conrad S. Josias, et al., Ser. No. 835,290, filed May 29, 1969, and assigned to the assignee of the present invention, a gas detector and analyzer was described which utilized an electron-capture ionization detector to signal the presence of very low concentrations of different chemical compounds in an environment. That application cited and relied upon a prior patent to James E. Lovelock, U. S. Pat. No. 3,247,375, which taught an electron-capture ionization detector and circuits which made such a device a useful tool for analysis.

Recently, Dr. James E. Lovelock delivered a paper entitled "Analysis by Gas Phase Electron Absorption" at the Seventh International Symposium on Gas Chromography Discussion Group of the Institute of Petroleum held at the Falkoner Centret, Copenhagen, Denmark, from June 25 to June 28, 1968. The paper was subsequently published by the Institute of Petroleum of London, W1, Great Britain in 1969 as part of a volume entitled "Gas Chromotography, 1968," edited by C. L. A. Harbourn.

The Lovelock paper described in some detail the history of the electron-capture detector noting that electron absorption was a technique almost entirely dependent upon gas chromatography for its existence, the "electron-capture" detector being so sensitive that it could function efficiently only with pure vapors greatly diluted in a clean stream of carrier gas emerging from a chromatograph column. That article is considered supplementary to and cumulative of Dr. Lovelock's prior papers, including the article "Ionization Methods for the Analysis of Gases and Vapors," published at page 162 in the Feb., 1961, issue of "Analytical Chemistry," Volume 33, No. 2, and a subsequent paper entitled "Electron Absorption Detectors and the Technique for their Use in Quantitative and Qualitative Analysis by Gas Chromatography," published at page 474 of Analytical Chemistry, Volume 35, No. 4, of April 1963.

In the Gas Chromatography 1968 article, Lovelock also described the chemical and physical basis for the operation of the electron-capture detector and discussed the parameters that were important in the construction of such a detector. At page 102, Lovelock discussed the methods of operating such electron-capture detectors. A severe drawback of the earliest versions was the limited dynamic range of such detectors. The DC method then employed applies a fixed potential difference between the electrodes of the detector. The detector is subjected to a stream of inert carrier gas which does not itself absorb electrons. The potential is adjusted to a value sufficient to collect all of the electrons liberated from the carrier gas by a radiation source which ionizes the gas.

An electron-absorbing vapor introduced into the gas stream collects the free electrons to produce negative molecular ions which then recombine with the positive ions resulting from ionizing radiation. The change in current flow attributable to the presence of electron-capturing compounds is determined. If the decrease of current flow is measurable, then a quantitative indication of the electron-absorbing compound can be achieved.

Alternatively, the potential can be increased to a value that maintains the current flow at a constant value and the change of potential would also represent a measure of the quantity of electron-absorbing compound present. Yet other methods utilize higher potentials, but generally, such higher potentials result in a nonlinear response to vapor concentration.

As described by Lovelock in the 1963 Analytical Chemistry paper, supra, a pulsed sampling technique can be employed involving the use of brief pulses of potential, at relatively infrequent intervals. Lovelock suggested a 50-volt pulse of 0.5-microseconds duration, at intervals of approximately 100 microseconds. This pulsed sampling procedure enjoyed several advantages in that:

1. For most of the time, no field is applied to the detector so that free electrons are in thermal equilibrium with gas molecules;

2. The sampling pulse is so brief that no significant movement of negative ions occurs, avoiding inaccuracies due to space-charge effects or the collection of negative ions at the anode;

3. A pulse amplitude of 30 volts is sufficient to collect all of the electrons;

4. The ultimate sensitivity is increased since the time for encounter between absorbing molecules and electrons is extended to the point where natural recombination limits any further increase in sensitivity; and 5. Except for those compounds whose absorption cross-sections increase greatly with small increases in energy, and for which sensitivity improves only in dc systems, the pulse method is much more reliable, and in general, sensitivity is improved.

In the copending Josias, et al. application, the pulsed sampling technique as described by Lovelock was modified. A highly-stable pulse source, for example, a crystal-controlled oscillator whose frequency stability exceeds one part in $10^8$, was provided. The magnitude of the pulses was reduced to approximately 30 volts, and the pulse duration was extended to 3 microseconds. These pulses were repeated at 100-microsecond intervals. It appeared that the lower-voltage pulses of longer duration also adequately swept all of the electrons from the ionization detector and provided a current which, when averaged, could be used to signal concentration.

In the Gas Chromatography article, Lovelock, at pages 102 and 103, disclosed yet other improved pulse methods for increasing the dynamic range of the detector. Detectors were described in which a signal for measurement was not produced directly. Rather, the detector serves as a sensor to indicate a departure from a steady-state condition.

One circuit was disclosed in which the output of an electrometer amplifier was fed back to a pulse generator where it was compared to a reference current. The result of the comparison was used to set the pulse interval. The output of such a system was not a current to a recorder, but was a digital or frequency signal.

SUMMARY OF THE INVENTION

Applicants herein have conceived of an improved extended-dynamic-range device which they have termed a "frequency-programmed electron-capture detector." It is noted that Lovelock, at page 103 of the Gas Chromatography article, without the consent of the inventors, discussed in general terms the present invention without describing it in detail. A block diagram was published (FIG. 6) which omitted some of the elements of the present invention that are deemed to be essential to the proper operation of the invention.

According to the present invention, it is not enough to merely provide a comparator which compares the electrometer output with a reference to control a pulse generator; it is also necessary that the reference be applied in the form of a ramp signal.

The electrometer output is initially "zeroed" in the presence of a stream of pure carrier gas to establish a "baseline." A reference voltage is applied to a relaxation circuit, such that the voltage changes in a linear, ramp fashion between an upper and a lower reference voltage over an interval related to the period of the lowest useful frequency.

In one embodiment, the interval selected to provide maximum sensitivity was 200 microseconds during which the ramp voltage had a 10-volt excursion. The relationship between the electrometer output and the concentration of a predetermined electron-capturing compound is extremely nonlinear. However, the relationship between frequency and concentration is, for all practical purposes, a highly linear one. The change in frequency can then be a measure of concentration and can directly provide an output signal.

The novel features which are believed to be characteristic of the invention, both as to organization and method of operation, together with further objects and advantages thereof, will be better understood from the following description considered in connection with the accompanying drawings in which several preferred embodiments of the invention are illustrated by way of example. It is to be expressly understood, however, that the drawings are for the purpose of illustration and description only and are not intended as a definition of the limits of the invention.

BRIEF DESCRIPTION OF THE DRAWINGS

FIG. 2 is a circuit diagram of a preferred embodiment of the system of FIG. 1.

DESCRIPTION OF THE PREFERRED EMBODIMENTS

Figure 1:
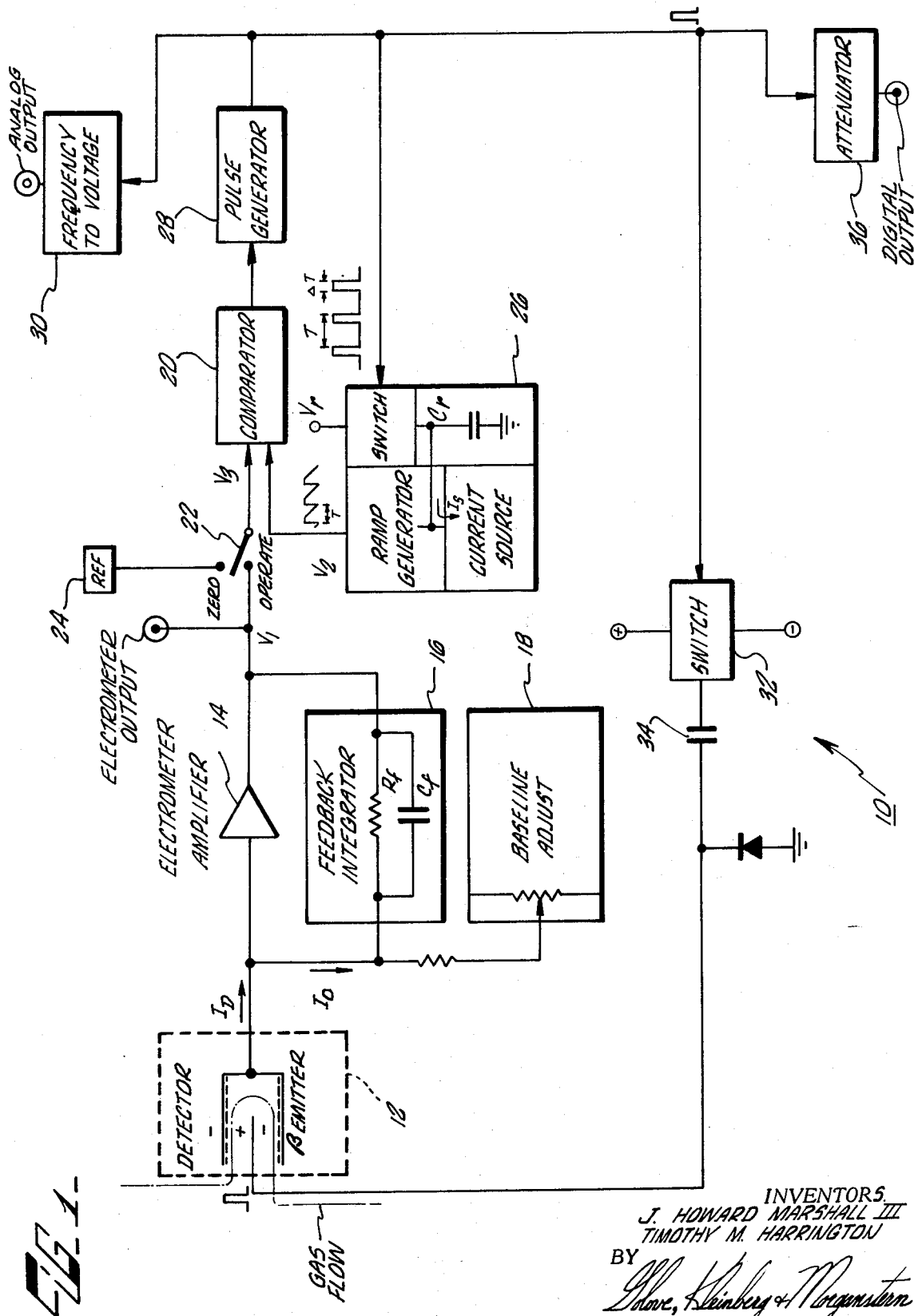
FIG. 1 is a block diagram of a frequency-programmed electron-capture detector system.

Turning first to FIG. 1, there is shown, in block diagram, a frequency-programmed electron-capture detector system which is operable in a gas detector and analyzer such as that disclosed in the copending application of Conrad S. Josias, et al., Ser. No. 835,290, filed May 29, 1969, and assigned to the assignee of the present invention. There is shown a capture-detector circuit 10 which includes the electron-capture detector 12. The capture detector 12 may be identical to that disclosed in the above-identified Josias, et al. application or as described in any of the Lovelock publications. The output of the capture detector 12 is applied to an electrometer amplifier 14, the output of which is fed back via an integrating circuit 16 so that a steady-state output can be provided in response to a pulse input. A baseline-adjusting circuit 18 also applies a current to the input of the electrometer amplifier 14.

A comparator circuit 20 has one input connected to a mode switch 22 which, in a first position, couples the comparator to a source of reference voltage 24 and, in an alternative configuration, couples the comparator 20 to the output of the electrometer amplifier 14. A second input to the comparator 20 is provided from a ramp generator 26, to be described in greater detail below. The output of the comparator 20 is applied to a pulse generator 28. It is the output of the pulse generator 28 that represents the capture-detector circuit 10 signal output. For output or display purposes, the pulse generator is coupled to a frequency-to-voltage converter 30 so that the concentration of the unknown electron-capturing compound can be displayed utilizing a conventional voltage meter or recorder (not shown).

The output of the pulse generator 28 is also applied to the ramp generator 26, where it is used to initiate an interval during which a voltage having a first value linearally changes to a second value at a predetermined rate. The output of the ramp generator, as noted above, provides the second input to the comparator 20. It is the comparison of the magnitude of the voltage of the ramp generator 26 with the magnitude of the output of the electrometer amplifier 14 that, when equal, provides an output to the pulse generator 28 which, in turn, triggers the generation of a pulse signal that initiates a new ramp interval in the ramp generator 26.

The output of the pulse generator 28 is also applied to a switch 32 which is coupled through a capacitor 34 to the detector 12.

The individual pulses generated by the pulse generator 28 and applied to the switch 32 "sweep" the detector 12 of all charged particles and, as described in the Josias, et al. application, provide an input to the electrometer amplifier 14.

The pulses are also applied to an attenuator circuit 36 to provide a direct pulse output. Such an output can drive a digital counter (not shown), which can provide a number proportional to the concentration of an electron-capturing compound.

The mode switch 22 when connected to the source of reference voltage 24 (usually zero volts) causes the pulse generator 28 to operate at a fixed frequency (usually 5 kHz) and enables a "zeroing" of the electrometer amplifier by appropriate adjustment of the baseline current through the baseline-adjust circuit 18. This zeroing is done in the presence of a pure carrier gas and establishes a lower signal limit which can be utilized to zero any display devices that may be used.

In the presence of an electron-capturing compound, the electrometer amplifier will provide an output signal to the comparator with the mode switch 22 in the operating configuration. When the output of the ramp generator 26 falls to a value equal to the voltage applied to the comparator 20 through the mode switch 22, the pulse generator 28 will be triggered. As the magnitude of the output signal of the electrometer amplifier 14 increases resulting from a decrease in detector current, the equality relationship will be reached after an increasingly shorter interval, and the pulse generator 28 will provide pulses at a higher frequency.

The higher frequency of pulses applied to the detector 12 necessarily reduces the probability that an electron will be captured by an electronegative compound or a positive ion, thereby increasing the current to the electrometer amplifier 14. The increased current output then requires that a longer portion of the ramp interval ensue before equality is reached, thereby reducing the frequency.

It will be seen that the system will stabilize at a frequency value which is directly proportional to the concentration of electron-capturing compounds in the stream of carrier gas.

Given the apparatus illustrated in FIG. 1, the mathematical basis for the linear relationship between frequency and concentration can be derived from a consideration of the following relationships.

Consider a mixture of a carrier gas 1 and an electron absorber compound 2.

TABLE I $t$ = time from the end of the application of a voltage pulse $R_e$ = rate of electron production from a radioactive $\beta$-emitter including electron-multiplication processes in the carrier gas $N_T$ = total number of molecules in the detector $N_{D_1}$ = number of positively-ionized carrier gas molecules in the detector at $t=0$ $N_{D_2}$ = number of electron-absorbing gas molecules in the detector at $t=0$ $N_{A_1}(t)$ = number of ionized carrier-gas molecules that have captured one electron at a time $t$ $N_{A_2}(t)$ = number of electron-absorbing gas molecules that have captured one electron at a time $t$ $N_e(t)$ = total number of electrons in the detector at a time $t$ $\sigma_1$ = probability per unit time of capture of an electron by an ionized carrier-gas molecule which has not captured one electron (i.e., "recombination" rate)

$\sigma_2$ = probability per unit time of capture of an electron by an electron-capturing gas molecule which has not captured one electron The rate of production of electrons is given by:

$$\left.\frac{dN_e(t)}{dt}\right|_{\text{production}} = R_e. \quad (1)$$

The rate of removal of electrons by means of electron capture by gas molecules is given by:

$$\left.\frac{-dN_e(t)}{dt}\right|_{\text{removal}} = N_e(t)[\sigma_1(N_{D_1}-N_{D_1})+\sigma_2(N_{D_2}-N_{A_2})] \quad (2)$$

The first term in Equation (2) represents recombination of electrons with positive ions in the carrier gas. These ions were produced by the electron multiplicative processes starting with the energetic α particles. The second term in Equation (2) represents the capture of electrons by electronegative gas molecules. Both of these terms can be trivially generalized to include more than two gas species.

Combining the differential Equations (1) and (2) gives the net rate of electron production:

$$\frac{dN_e(t)}{dt} = R_e - N_e(t)[\sigma_1 N_{D_1} - N_{A_1}) + \sigma_2 N_{D_2} - N_{A_2})] \quad (3)$$

Assume that at the end of a given period $T$ all the electrons in the detector are swept out by a voltage pulse with a width short with respect to $T$. In addition, assume that $N_A$ is negligible with respect to $N_D$. Then at equilibrium:

$$N_e(0) = 0$$
$$\frac{dN_e(t)}{dt} = R_e - N_e(t)[\sigma_1 N_{D_1} + \sigma_2 N_{D_2}] = R_e - N_e(t)\alpha_1$$

where $$\alpha_1 \equiv \sigma_1 N_{D_1} + \sigma_2 N_{D_2} \quad (4)$$

Integration and evaluation of the integration constant by utilization of the boundary condition $N_e(t) = 0$ when $t = 0$ gives:

$$N_e(t) = \frac{R_e}{\alpha_1}(1 - e^{-\alpha_1 t}) \quad (5)$$

If $\alpha_1 t \ll 1$, the exponential may be expanded in a power series, neglecting all but the first, second and third order terms:

$$N_e(t) \cong \frac{R_e}{\alpha_1}\left(1 - \left[1 - \alpha_1 t + \frac{\alpha_1^2 t^2}{2} - \frac{\alpha_1^3 t^3}{6}\right]\right)$$
$$= R_e t\left(1 - \frac{\alpha_1 t}{2} + \frac{\alpha_1^2 t^2}{6}\right) \quad (6)$$

The average detector current is given by:

$$I_D = \frac{N_e(T)q}{T} \quad (7)$$

where $T$ is the pulse interval and $q$ is the charge on the electron ($1.6 \times 10^{-19}$ C). In Equation (7) is contained implicitly the assumption that Equations (1) and (2) apply during the period when the voltage pulse is present. This assumption is based on the discussion presented by Wentworth, Chen and Lovelock on page 449 of their article appearing in the Journal of Physical Chemistry, 70, 445 (1966). In that discussion, they determined that, for a carrier gas containing 90 percent argon and 10 percent methane, the average electron energy would be increased only slightly above its thermal value during the application of the pulse. They then presented data to confirm this prediction. From (6) and (7) the expression for the average detector current then becomes:

$$I_D \cong qR_e\left(1 - \frac{\alpha_1 T}{2} + \frac{\alpha_1^2 T^2}{6}\right) \quad (8)$$

If the baseline detector current is defined by $$I_B \equiv q^R_e \quad (9)$$

then the decrease in baseline current due to electron-capture processes is derived from (8) and (9):

$$\Delta I = I_B - I_D \cong qR_e\left[1 - \left(1 - \frac{\alpha_1 T}{2} + \frac{\alpha_1^2 T^2}{6}\right)\right]$$
$$= \frac{qR_e \alpha_1 T}{2}\left(1 - \frac{\alpha_1 T}{3}\right) \quad (10)$$

For $(\alpha_1 T)/3 \ll 1$, the fractional decrease in baseline current is:

$$\frac{\Delta I}{I_B} \cong \frac{\alpha_1 T}{2} \quad (11)$$

indicating that $\Delta I$ is approximately proportional to $\alpha_1$.

If the definition of $\alpha_1$ given in Equation (4) is used, Equation (11) then becomes:

$$\frac{\Delta I}{I_B} \cong \frac{T}{2}(N_{D_1}\sigma_1 + N_{D_2}\sigma_2) \quad (12)$$

indicating the approximate proportionality of detector current change to the number of electron-absorbing gas molecules in the detector.

In the derivation of Equation (11), $\alpha_1 T/3$ was assumed to be small with respect to 1. Thus Equation (11) is accurate only if $(2\Delta I)/(3I_B)$ is kept small. If the period $T$ is allowed to be programmed so that this inequality holds, then the dynamic range for linear operation can be vastly increased over that resulting from fixed-period (or fixed-frequency) operation.

The relationship can be demonstrated by considering that the output voltage $V_1$ of the electrometer 14 of FIG. 1 is proportional to the decrease in detector current: $I_B - I_D = \Delta I$ (Equation 10).

In the preferred embodiment, the electrometer 14 was set for a maximum value of its output of +10 volts.

The voltage, $V_2$, produced by the ramp generator 26 is an inverse saw-tooth wave which is created by subtracting the voltage across a capacitor within the ramp generator from a fixed reference voltage, $V_r$, which is set at +10 volts. The ramp generator 26 is designed so that the capacitor discharges at a constant rate. Thus, the output of the ramp generator at any time $t$ is:

$$V_2 = V_r - \frac{I_s t}{C_r} \quad (13)$$

where $I_s$ represents the current from a source within the ramp generator and $V_2 = V_r$ at $t = 0$. $C_r$ is the capacitance of the capacitor within the ramp generator 26.

When $V_2$ falls to a value equal to $V_3$, the comparator 20 causes the pulse generator 28 to produce a pulse with a width ($\Delta T$) of 50 to 100 ns. This pulse closes the switch in the ramp generator for 50 to 100 ns, causing $V_2$ to once again equal $V_r$. Equation (13) then describes the behavior of $V_2$ for times measured from the opening of the switch. This behavior repeats at a frequency determined by $V_3$. The period $T$ of this oscillation is given by the solution of the following equation:

$$V_1 = V_3 = V_2 = V_r - I_s\left(\frac{T}{C_r} - \Delta T\right) \quad (14)$$

The pulse generator 28 also causes the switch 32 to apply a pulse to the detector 12. This pulse sweeps the electrons from the detector in the manner described above and causes the detector current $I_D$ to flow. The magnitude of this current is described by Equations (7) and (5), and by Equation (11) when $(2\Delta I)/(3I_B) \ll 1$.

A current $I_o$ is subtracted from the detector current by the baseline-adjust circuit 18. The difference of these currents then flows in the electrometer 14 feedback resistor having a resistance $R_f$. (The feedback capacitor having a capacitance $C_f$ filters the high-frequency variations of the detector current.) For an ideal electrometer 14, its output voltage $V_1$ becomes:

$$V_1 = V_3 = (I_o - I_D)R_f \quad (15)$$

Applying Equations (10), (14) and (15), one obtains for the period $T$:

$$T = \frac{C_r}{I_s}[V_r - (I_o - I_B + \Delta I)R_f] + \Delta T \quad (16)$$

If, in addition, it is assumed that $2\Delta I/3I_B$ is negligible compared to unity, then Equation (11) is valid and $$T \cong \frac{C_r V_r}{I_s} \left[ \frac{1 + \frac{(I_B - I_o) R_f}{V_r}}{1 + \frac{C_r \alpha_1 I_B R_f}{2 I_s}} + \frac{I_s \Delta T}{C_r V_r} \right] \quad (17)$$

The frequency of oscillation $f$ then becomes:

$$f = \frac{1}{T} \cong \frac{I_s}{C_r V_r} \left[ \frac{1 + \frac{C_r \alpha_1 I_B R_f}{2 I_s}}{1 + \frac{(I_B - I_o) R_f}{V_r}} + \frac{I_s \Delta T}{C_r V_r} \right] \quad (18)$$

Note that this frequency is approximately proportional to the number of electron-absorbing gas molecules in the detector $N_{D_2}$, as can be seen from Equations (4) and (18) combined.

In the preferred embodiment, the value of $I_o$ is chosen so that the frequency $f_o$, resulting when $N_{D_2} = 0$, is made independent of $R_f$. This choice allows the use of a relatively unstable resistor for $R_f$, which typically has a value near $10^{10}$ ohms. In this case, $$I_o = I_B \left[ 1 - \frac{\sigma_1 N_{D_1}}{2 f_o} \right] + \frac{f_o \Delta T V_r}{R_f} \quad (19)$$

and $$f_o = \frac{I_s}{C_r V_r} \quad (20)$$

With this choice, then Equations (18), (19) and (20) imply that $$f \cong f_o + f_o \frac{N_{D_2} \sigma_2}{N_{D_1} \sigma_1} \left[ \frac{1}{1 + \frac{2 V_r f_o}{N_{D_1} \sigma_1 R_f I_B}} \right] \quad (21)$$

In terms of concentration $C$, defined as the ratio of $N_{D_2}$ to the total number of molecules in the detector $N_T$, then $$f \cong f_o + C[\alpha_2 f_o] \left[ \frac{1}{1 + \frac{2 V_r f_o}{N_{D_1} \sigma_1 R_f I_B}} \right] \quad (22)$$

where $$\alpha_2 \equiv \frac{N_T \sigma_2}{N_{D_1} \sigma_1} \quad (23)$$

and $$C \equiv \frac{N_{D_2}}{N_T} \quad (24)$$

In order for this analysis to be accurate, the inequality, $2\Delta I/3I_B \ll 1$, must be satisfied. The magnitude of this quantity can be calculated from Equations (16) and (21) to yield:

$$\frac{2\Delta I}{3 I_B} \cong \frac{N_{D_1} \sigma_1}{3 f_o} + \frac{2 V_r}{3 I_B R_f} \left( 1 - \frac{f_o}{f} \right) \quad (25)$$

The first term in this description of the deviation from Equation (11) is a constant as a function of $N_{D_2}$ or $f$ and thus does not represent a nonlinearity in the relationship between $f$ and $N_{D_2}$ as described by Equation (18). The second term does represent such a nonlinearity, but can be made infinitesimal by suitable choices of $V_r$ and $R_f$. In the preferred embodiment, $V_r = +10$ V, $R_f = 10^{10}$ ohms, and $I_B = 3 \times 10^{-8}$ A, so that $2\Delta I/3I_B$ changes only $\pm 1$ percent for $f_o < f < \infty$.

Typically for a carrier gas in the detector consisting of 95 percent argon with 5 percent methane, $$N_{D_1} \sigma_1 = 1.5 \text{ kHz} \quad (26)$$

For this case in the preferred embodiment, $f_o$ is chosen to be 5 kHz so that the first term of Equation (25) has a value of 10 percent.

The restriction that $f_o$ be large compared to $$\frac{N_{D_1} \sigma_1}{3}$$

is essential only for computational convenience in deriving Equation (17). Even if $f_o$ has a lower frequency or the frequency corresponding to $\sigma_1 N_{D_1}$ is higher as a result of electronegative gases being present, the proportionality between $\Delta f$ and $C$ still holds. The proportionality constant $k$ must be modified, however, to take into account such nonlinearities in the baseline. Thus, one can write: $\Delta f \equiv f - f_o = kC$ (27).

The lower limit for $\Delta f$ is given by the instabilities in the baseline frequency $f_o$. In the preferred embodiment, these fluctuations are determined by small changes in the properties of the carrier gas (or impurities contained in it) and not by electronic drifts. Typically these fluctuations are about 5 Hz for $f_o = 5$ kHz in nearly pure 95 percent A, 5 percent $CH_4$ carrier gas.

The upper limit for $f$ results from the non-zero time required to collect the electrons from the detector. Typically this time is less than 100 ns. In the preferred embodiment, an upper operating frequency of 5 MHz was chosen, resulting in a 200-ns minimum period between pulses. Experimentally it has been found that total charge collection can be made to occur during the 50- to 100-ns wide pulse from the switch 32. A slight deviation from linear performance has been found at frequencies above 1 MHz, probably resulting from the fact that the electron energies are not precisely thermal during the period that the pulse from switch 32 is applied to the detector. However, satisfactorily linear operation has been achieved using the preferred embodiment for values of $\Delta f$ between 5 Hz and 5 MHz, thus extending the linear dynamic range for the electron-capture detector over six decades.

Therefore, it will be appreciated that the expected dynamic range of the detector for compounds, such as sulfur hexafluoride ($SF_6$), would be approximately six decades. This dynamic range would also be applicable to electron-capturing compounds that are up to 1/100 as electronegative as sulfur hexafluoride.

Turning next to FIG. 2, there is shown a preferred embodiment of circuits mechanizing the several blocks of FIG. 1. As illustrated, the mode switch 22 is shown as alternatively connected to the reference source 24 which, in the illustrated embodiment, is ground. Alternatively, the switch 22 connects to the output of the electrometer amplifier 14.

The comparator circuit 20 is mechanized by a pair of FET devices 42a, 42b. The electrometer signal is applied to the gate of one of the FET devices 42a, and similarly, the reference signal from the ramp generator is applied to the gate of the other of the FET device 42b.

The drains of the two FET devices 42a, 42b are coupled together through a pair of diodes 44, 46 connected in parallel in respectively opposite directions. The output of the comparator 20 is provided from a pair of common-emitter comparator transistors 48a, 48b, which are commonly coupled through their emitters to a negative potential source 50.

In order to maintain the flow of current through the comparator, the sources of the FET devices 42a, 42b are commonly connected to the collector of a supply transistor 52, the emitter of which is connected to a source of positive potential 54 through a resistor. The supply transistor 52 is operated as an amplifier to provide a reasonably constant current flow to the comparator 20. A voltage divider 56, connected between the positive source 54 and a common reference point 58, provides a predetermined bias to the base of the current-source transistor 52 to control the amount of current supplied thereby.

As long as the reference voltage exceeds the electrometer voltage, the FET device 42b conducts less than one-half of the current from the supply transistor 52, while the FET device 42a conducts more than 50 percent of this current. Similarly, the comparator transistor 48a is conducting, while the other comparator transistor 48b is held nonconducting. The output of the conducting comparator transistor 48a is applied to the pulse generator 28.

The voltage drop across the diodes 44, 46 is sufficient to create a differential between the voltage applied to the base of the first comparator transistor 48a and the second comparator transistor 48b. This differential is sufficient to maintain the differential operation of the transistor pair.

The pulse generator 28 includes a trigger transistor 60 and an accelerating transistor 62 connected in parallel therewith. The output of the trigger transistor 60 is applied to the base of first-stage inverter transistor 64, the output of which is applied to the base of a second-stage inverter transistor 66, the output of which, in turn, is applied in parallel to the bases of a pair of inverting output transistors 68 and 70.

The collector of the one output transistor 68 is coupled to the collector of the other, complementing output transistor 70. The output of the pulse generator 28 is taken from the common connection of the collectors of the output transistors 68, 70. The output of the pulse generator 28 is applied to the switching circuit 32, a frequency-to-voltage conversion device 30, the ramp generator circuit 26, and an attenuator 36.

The switch circuit 32 functions as a pulse amplifier operating in a switching mode. An input transistor 72 applies its output to the base of an intermediate-stage transistor 74, which in turn is coupled to the base of an output-stage transistor 76. The input transistor 72 is normally "off," the intermediate-stage transistor is normally "on," and the output transistor is normally "off."

The output transistor 76 is capacitively coupled as an emitter follower to the detector circuit 12. Further, the input to the base of the input transistor 72 is by way of a capacitive coupling so that the circuit responds only to pulses, rather than to steady-state or DC levels.

The pulse output of the output transistor 68 of the pulse generator 28 is also applied through a capacitive coupling to the emitter of a frequency-to-voltage transistor 78. The base of the frequency-to-voltage transistor 78 is connected to the positive potential source 54, and the collector is coupled through an RC filter circuit 81 to the source of common potential 58. The values of the emitter-coupling capacitor 80 and the capacitor in the filter circuit 81 are selected to provide a nearly steady voltage output that is proportional to the frequency of the applied input pulses within the operating frequency range. The time constant of the output filter circuit 81 determines the speed of response of the analog output.

The pulse output of the pulse generator 28 is also applied to the ramp-generator circuit 26, which includes a pair of transistors 82, 84 connected together in parallel as normal-mode choppers. A ramp capacitor 86 is connected across the pair of transistors 82, 84 between a positive precision reference potential source 91 and a source of current supplied by transistor 88a. During the positive portion of the pulse from the pulse generator 28, the ramp capacitor 86 is charged to a voltage $V_r$, which is equal to the potential of the precision reference source 91. During the negative portion of the pulse-generator pulse, the ramp capacitor 86 is permitted to decay linearly with time as a result of the current supplied by transistor 88a.

The current source for the ramp generator is made up of a pair of transistors 88a, 88b which are connected to a voltage divider 90. Transistors 88a and 88b are coupled and biased so that each branch contributes an equal current flow through the common emitter resistor 92, which is coupled to the negative potential source 50.

In operation, the ramp capacitor 86 is initially charged to the potential of the positive precision reference potential source 91 by the action of switching transistors 82, 84, which are held in conduction by the output of the pulse generator 28 being near the positive potential 58. The reference potential 91, which in the preferred embodiment is +10 volts, is applied to the gate of the comparator FET device 42b, which forces that device to conduct less than one-half of the current of the supply transistor 52.

More than one-half of the supply current is drawn through the other input FET device 42a, which biases the comparator transistor 42a into conduction. The bias of the pulse generator then forces the trigger transistor 60 out of conduction.

When the timing network 94 allows the accelerating transistor 62 to stop conducting, the intermediate-stage transistor 64 and the output-stage transistor 68 are placed in conduction, and the other intermediate-stage transistor 66 and the complementary output transistor 70 are forced out of conduction. The output of the pulse generator 28 then falls to the voltage of the common reference point 58. Switching transistors 82, 84 then stop conducting, and the voltage on the ramp capacitor 86 drops according to the predetermined relationship. The voltage at the gate of the reference FET device 42b thus approaches the voltage which is applied to the gate of the input FET device 42a.

The drain coupling diodes 42, 46 maintain a sufficient voltage differential between the bases of the comparator transistors 48a, 48b to maintain the conduction of transistor 48a when the voltage on the reference gate exceeds the voltage on the input gate. As the voltage at the reference gate approaches the input voltage, the reference FET device 42b begins to conduct more heavily and diverts current from the input FET device 42a. The effect is reflected in the output of comparator transistor 48a which begins to turn off, resulting in a voltage rise at the base of the trigger transistor 60 of the pulse generator 28.

As the trigger transistor 60 begins to conduct, the intermediate-stage transistor 64 and the output-stage transistor 68 are turned "off," and the second intermediate-stage transistor 66 and the complementing output transistor 70 begin to turn "on." Considering the propagation delays, by the time the complementary transistor 70 is turned on, the trigger transistor 60 is saturated in the conducting mode. The output of the output transistor 68 is sent back to a timing network 94 to turn on the accelerating transistor 62 to maintain the intermediate-stage transistor 64 in the nonconducting state.

The output of the intermediate-stage transistor 66 is coupled through a diode 96 to turn off the trigger transistor 60, thereby resetting it for a new pulse. However, the timing network 94 maintains the accelerating transistor 62 in conduction.

The leading edge of the output pulse produced by the output transistors 68, 70 of the pulse generator 28 is applied to the ramp switch transistors 82, 84, turning them on, which reapplies the full 10-volt potential to the ramp capacitor 86. This results in the reapplication of a 10-volt signal to the gate of the reference FET device 42b, thereby increasing the conduction in the input FET device 42a and assuring conduction of transistor 48a. The resulting collector current of transistor 48a then maintains the trigger transistor 60 of the pulse generator out of conduction until once again the reference voltage falls to the value of the input voltage.

At this point, the output pulse has completed its rise and has reached the "flat-top" portion that is maintained until the timing circuit 94 decays sufficiently to turn off the accelerator transistor 62, thereby restoring all of the other circuit elements to their original, quiescent state. As the pulse at the output transistor 68 decays, the falling wave is applied to the base of the accelerating transistor 62 and rapidly discharges the timing network 94 through diode 92 to restore the timing network to its quiescent state in readiness for succeeding pulses, thus making the output pulse duration relatively independent of operating frequency. As the voltage of the ramp capacitor 86 again falls to a value equal to the magnitude of the input signal from the electrometer, a new pulse will be generated and the ramp capacitor will again be reset.

In the preferred embodiment, the apparatus is calibrated by first placing the mode switch 22 in the "zero" position and adjusting the ramp-current-source potentiometer 90 to produce a 5.0 kHz output frequency. This adjustment frequently will compensate for possible errors in the comparator circuit in determining the equality between the input signal and the reference signal. The mode switch 22 is then placed in the "operate" position, and the baseline adjustment 18 is varied to give an output frequency of 5.0 kHz while pure carrier gas is flowing through the electron-capture detector 12. This adjustment establishes the conditions required by Equation (19).

To verify proper operation at the upper frequency end, the electrometer signal can be replaced with a voltage about 5 mV below the voltage of the 10-volt source. For this voltage the output frequency should be 5 MHz for $\Delta T = 100$ ms. Varying this frequency usually necessitates an adjustment of the response characteristics of the pulse-generator circuit 28, which, in this made, would be operating virtually continuously.

Thus, there has been shown an improved frequency-programmed electron-capture detector circuit. The improved circuit provides a signal whose frequency is proportional to the concentration of electron-capturing compounds in the sample under analysis. Moreover, the actual current and/or voltage of the electron-capture detector device and electrometer amplifier is not amplified to provide an analog-type output signal, but rather is used to determine the output frequency. This output signal, in turn, controls the time available for exposure of the sample in the detector to thermalized electrons resulting from radioactive decay.

As will be readily appreciated, higher concentrations of electron-capturing compounds will be subjected to relatively briefer intervals of exposure to the electrons, while low concentrations permit longer exposure intervals. Accordingly, throughout the dynamic range of the apparatus, the number of electrons captured is small compared to the number produced, and thus the capture detector remains in a linear operating region.

What is claimed as new is:

1. For use in combination with an electron-capture detector, a pulse-generating circuit for providing an output signal having a frequency corresponding to and representative of the concentration of an electron-capturing compound, the circuit comprising:
    a. electrometer-amplifier means coupled to the electron-capture detector for providing a first output signal representative of the relative concentration of an electron-capturing compound in a sample quantity;
    b. ramp-generator means, including a resettable oscillator circuit exhibiting a linear change-of-magnitude-with-time characteristic for providing a second output signal of continuously varying magnitude;
    c. comparator means coupled to said electrometer-amplifier means and said ramp-generator means and responsive to applied first and second output signals, for providing a distinctive comparator output signal when said first and second output signals applied thereto are equal in magnitude; and
    d. pulse-generator means coupled to said comparator means, ramp-generator means and the electron-capture detector, said pulse-generator means being operable in response to said distinctive comparator output signals for applying a pulsed signal output to reset said ramp-generator means and to clear the electron-capture detector,
whereby said pulse generator produces a pulsed signal output train having a frequency proportional to and representative of the concentration of an electron-capturing compound in a sample.

2. The circuit of claim 1, above, wherein said ramp-generator means include in combination:
    i. charging means adapted to store a predetermined quantum of electrical energy;
    ii. energy-source means coupled to said charging means for changing the electrical energy stored therein at a predetermined, linear rate; and
    iii. switching means connected to said pulse generator means and to said charging means for placing said charging means in a predetermined energy state in response to said pulse signal output.

3. The circuit of claim 2, above, wherein said charging means include a capacitor having one terminal connected to a first potential source;
    i. said energy-source means include a current-source circuit coupled to a second potential source; and
    ii. said switching means are connected across said capacitor for placing said capacitor in a predetermined state of charge.

4. The circuit of claim 1, above, wherein said comparator means include:
    i. current-source means connected to a first potential source;
    ii. a first branch connected between said current-source means and a second potential source and being a control input coupled to said ramp-generator means, the current flow in said first branch being controlled by the magnitude of said ramp-generator output; and
    iii. a second branch connected between said current-source means and a second potential source and having a control input coupled to said electrometer-amplifier means output, the current flow in said second branch being controlled by the magnitude of said electrometer-amplifier means output;
said second branch conducting virtually all of said current until the magnitude of said ramp generator output approaches equality with the magnitude of said electrometer-amplifier output, said ramp-generator output, when reset, being of a magnitude sufficient to prevent current flow in said first branch.

5. The circuit of claim 1, above, further including:
frequency-to-voltage converting means coupled to said pulse-generator means output for providing an output voltage signal proportional to and representative of the frequency of said pulsed signal output train.

6. The circuit of claim 1, above, further including:
audible output means coupled to said pulse generator means for generating an audible output tone whose pitch corresponds to and is representative of the frequency of said pulse signal output train.

7. The circuit of claim 1, above, further including mode-switching means interposed between said electrometer-amplifier means and said comparator means for applying in a first mode, the output of said electrometer-amplifier means to said comparator means and applying in a second mode, a potential of predetermined magnitude for calibrating purposes, whereby an upper frequency can be established for said pulse-generator means.

8. The circuit of claim 7, above, wherein a potential of approximately 10 volts is applied to said comparator means to establish in said circuit a pulsed output train having a frequency of 5 MHz.

9. The circuit of claim 1, above, wherein said pulsed output signal train has a pulse repetition frequency of 5 MHz in response to an electrometer-amplifier means input of substantially 10 volts and a pulse repetition frequency of 5 KHz in response to an electrometer-amplifier means input of substantially 0 volts, corresponding to an absence of electron-capturing compound in a sample quantity.

10. The circuit of claim 1, above, further including digital output means coupled to said pulse generator means, including frequency converting means for dividing the frequency output of said pulse generator to a frequency range compatible with digital output devices whereby the digital output corresponds to and is representative of the concentration of electron-capturing compound in a sample.

* * * * *

UNITED STATES PATENT OFFICE
CERTIFICATE OF CORRECTION

Patent No. 3,671,740                     Dated  June 20, 1972

Inventor(s) J. Howard Marshall, III and Timothy M. Harrington

It is certified that error appears in the above-identified patent and that said Letters Patent are hereby corrected as shown below:

Col. 4, lines 73-74, Change Equation (2) to read as follows:

$$\left.\frac{-dN_e(t)}{dt}\right|_{removal} = N_e(t)\ [\sigma_1\ (N_{D_1} - N_{A_1}) + \sigma_2\ (N_{D_2} - N_{A_2})\ ]\ .$$

Col. 5, line 4, After "energetic" change "α" to --β--  ;

line 12, Change Equation (3) to read as follows:

$$\frac{dN_e(t)}{dt} = R_e - N_e(t)\ [\sigma_1(N_{D_1} - N_{A_1}) + \sigma_2(N_{D_2} - N_{A_2})\ ]\ ;$$

line 56, After "Chemistry" change "70" to --70-- (add underscore)  ;

line 68, Change Equation (9) to read as follows:

$$I_B \equiv qR_e\ .$$

Col. 6, lines 12-13, Change Equation (12) to read as follows:

$$\frac{\Delta I}{I_B} \simeq \frac{T}{2}\ (N_{D_1}\sigma_1 + N_{D_2}\sigma_2)\ ;$$

line 63, After "<<1" insert --)-- (closing parenthesis)  .

Col. 7, line 74, the equation for $I_B$ should read as follows:

$$I_B = 3 \times 10^{-8}\ A$$

Signed and sealed this 2nd day of January 1973.

(SEAL)
Attest:

EDWARD M. FLETCHER, JR.        ROBERT GOTTSCHALK
Attesting Officer              Commissioner of Patents